US006933941B1

(12) United States Patent
Peercy et al.

(10) Patent No.: US 6,933,941 B1
(45) Date of Patent: Aug. 23, 2005

(54) SCENE REPRESENTATION METHOD AND SYSTEM

(75) Inventors: Mark S. Peercy, Cupertino, CA (US); David Blythe, San Carlos, CA (US); Bradley A. Grantham, Palo Alto, CA (US); P. Jeffrey Ungar, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 09/832,138

(22) Filed: Apr. 10, 2001

(51) Int. Cl.$^7$ .............................................. G06T 17/00

(52) U.S. Cl. ................. 345/428; 345/426; 345/440; 345/420; 345/506; 345/543

(58) Field of Search ............................... 345/426, 420, 345/440, 428, 506, 543

(56) References Cited

U.S. PATENT DOCUMENTS

| 5,777,621 A | * | 7/1998 | Schneider et al. ........... 345/428 |
| 5,798,770 A | * | 8/1998 | Baldwin ..................... 345/506 |
| 6,266,053 B1 | * | 7/2001 | French et al. ............. 715/500.1 |

OTHER PUBLICATIONS

Peercy et al., "Interactive Multi-Pass Programmable Shading", ACM 2000, pp. 425-532.*
U.S. Appl. No. 09/056,683, filed Apr. 8, 1998, Peercy, et al.

* cited by examiner

*Primary Examiner*—Kimbinh T. Nguyen
(74) *Attorney, Agent, or Firm*—Woodcock Washburn LLP

(57) ABSTRACT

One aspect of the invention is a method for representing a scene (S). The method includes providing a higher-level appearance description of an appearance of geometry in a retained-mode representation (13a, 300). The method also includes traversing the retained-mode representation (13a, 300) to provide a final representation (13b, 310, 320) that can be rendered by a graphics pipeline (17).

20 Claims, 3 Drawing Sheets

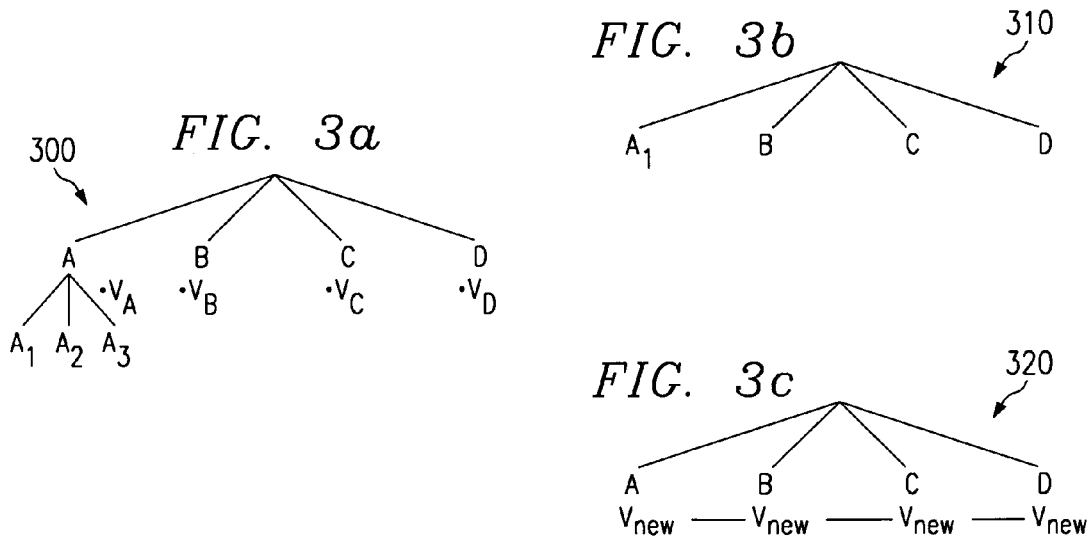
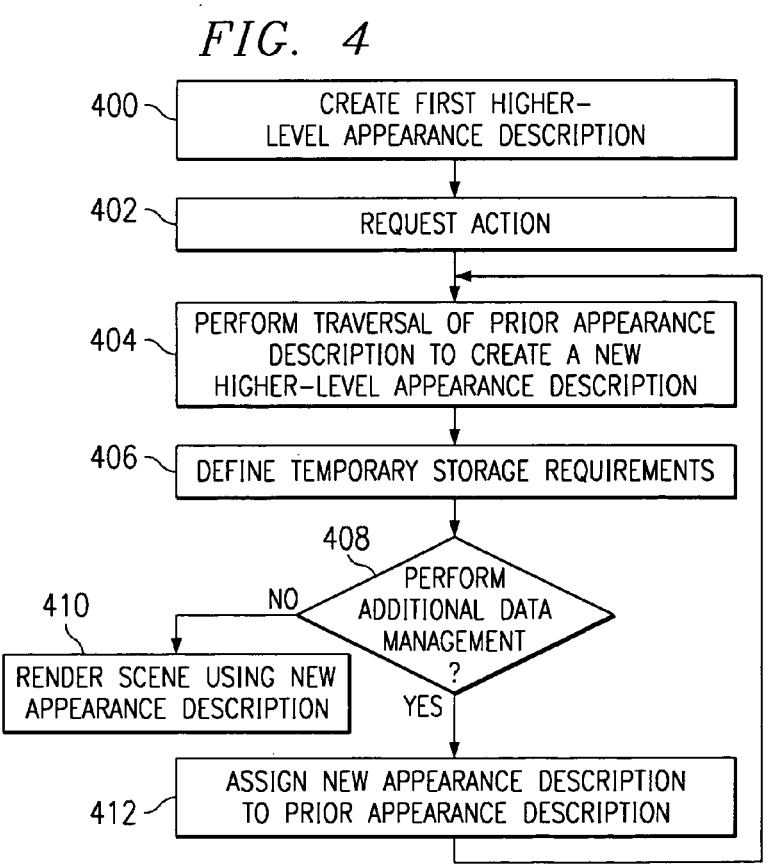

SCENE REPRESENTATION METHOD AND SYSTEM

TECHNICAL FIELD OF THE INVENTION

This invention relates generally to image processing and more particularly to a scene representation method and system.

BACKGROUND OF THE INVENTION

Programmable algorithms such as shading procedures typically require access to parameters that may be associated with a geometry to be drawn or rendered for an image scene or an object therein. Generally, the values of these parameters vary over each surface in response to an artist or technical director's input. For example, an artist may desire that colors vary across a portion of an image scene or object within. Algorithms such as shaders available to artists are thus desirably programmable to increase the flexibility with which designs may be implemented and/or modified.

Many systems provide a variety of hardware-accelerated methods to implement sophisticated surface shading algorithms to increase processing speeds. These conventional systems may take advantage of a graphics systems interface such as OPENGL® and/or a graphics pipeline. However, some of these systems typically break down programmable algorithms into steps that may be executed by the graphics systems interface and/or the graphics pipeline, but do not supply the parameters with geometry data or allow the parameters to be evaluated on the surface. Other systems may accept parameters but do not associate or evaluate them with tessellated surface values. As a result, these conventional systems typically cannot take advantage of the graphics pipeline, and thus may suffer from increased processing time. As a consequence, an artist's flexibility to change surface appearances interactively by using the parameters is reduced.

In addition, those systems that do utilize the graphics pipeline typically break down the algorithms into steps so specific to the pipeline that they cannot maintain the same level of performance while providing portability from platform to platform. In addition, some of these systems typically do not manage data to be used to draw image scenes with multiple objects using different programmable algorithms. Such a configuration may unnecessarily replicate data, exceed hardware resources and/or interfere with rendering of various objects.

SUMMARY OF THE INVENTION

From the foregoing, it may be appreciated that a need has arisen for a method and system for supplying and managing scene parameters for programmable shading applications. In accordance with the present invention, a system and method are provided that substantially reduce or eliminate disadvantages and problems of conventional systems.

One aspect of the invention is a method for representing a scene. The method includes providing a higher-level appearance description of an appearance of geometry in a retained-mode representation. The method also includes traversing the retained-mode representation to provide a final representation that can be rendered by a graphics pipeline.

The invention provides several important advantages. Various embodiments of the invention may have none, some, or all of these advantages. For example, the invention may be used to provide an infrastructure between a descriptive programmable application and a graphics system interface such as OPENGL®. For example, one technical advantage of the invention allows traversal of a higher-level appearance description so that it is translated into another representation that may be drawn for a graphics pipeline. Another technical advantage of the present invention is that it allows access to parameters for geometry that may be defined on any parametric surface. These parameters may then be evaluated on the surface by a graphics system interface for use in a graphics hardware or acceleration pipeline. The traversal may be implemented as a procedure using a variety of methods, and may be used with a variety of existing systems. For example, the invention may be integrated into an existing system library. In addition, the invention may also allow for extensibility so that new algorithms may be added as needed.

Another technical advantage of the present invention is that it may be used to manage data. For example, the invention may also minimize data replication and/or optimize the order of steps to be performed. Such an advantage may reduce the possibility that resources available may be exceeded, and may also minimize processing time and resources used. In addition, the invention may cull or identify various levels of detail needed to represent the appearance of a scene. Such an advantage may also reduce memory requirements and/or the possibility of interference between rendering of a variety of objects. For example, each traversal may manage data variables that may be shared, which may reduce or minimize an amount of data sent through a graphics pipeline, thus freeing up resources and bandwidth. This allows graphics systems interfaces such as OPENGL® to be used with graphics pipelines in a multi-pass scenario. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following descriptions taken in conjunction with the accompanying drawings, wherein like reference numerals represent like parts, and in which:

FIG. 3A graphically illustrates a higher-level appearance description that includes several levels of detail;

FIG. 3B graphically illustrates at least two level of detail traversals of the higher-level appearance description in FIG. 3A;

FIG. 3C graphically illustrates another traversal of the higher-level appearance description in FIG. 3A; and FIG. 4 illustrates an example of a method for representing scenes.

DETAILED DESCRIPTION OF THE INVENTION

Figure 1:
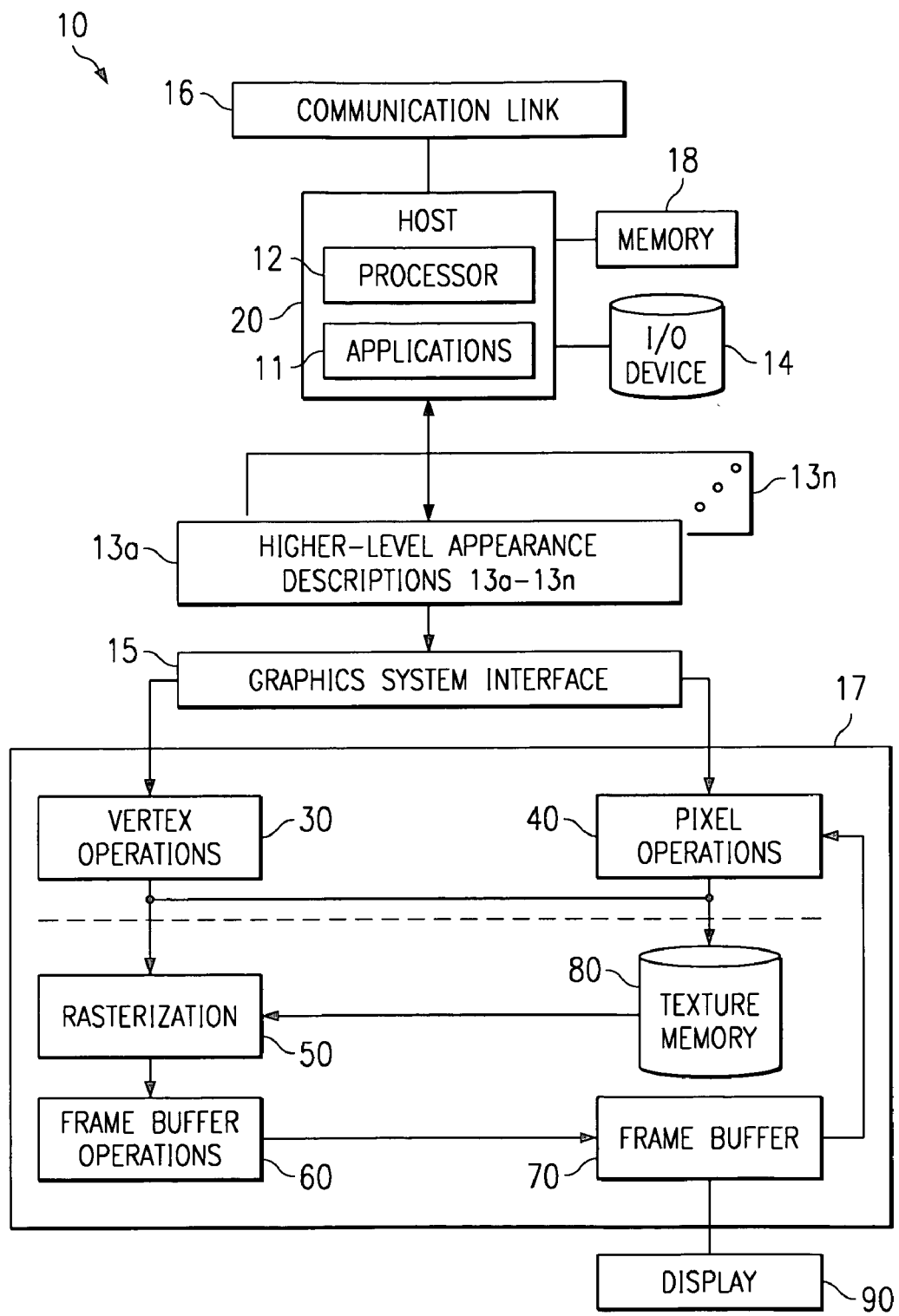
FIG. 1 is a block diagram of a graphics system.

FIG. 1 is a block diagram of a graphics system 10. Graphics system 10 includes a host 20 coupled to a graphics system interface 15 which couples to a graphics pipeline 17. Host 20 may be a general or a specific purpose computer and includes a processor 12 and a memory 18, which may include random access memory (RAM) and read only memory (ROM). Specifically, host 20 may be used to execute one or more applications 11 having image graphics and visualization software that may be stored in memory 13 and/or an input/output device 14. Results may be displayed using display 90 and/or stored in input/output device 14, which may be any suitable storage medium. Data processing may be performed using special purpose digital circuitry contained either in host 20 or in a separate device. Such dedicated digital circuitry may include, for example, application-specific integrated circuitry (ASIC), state machines, fuzzy logic, as well as other conventional circuitry. Host 20 may also include a portion of a computer adapted to execute any of the well known MS-DOS, PC-DOS, OS2, UNIX, MAC-OS, and Windows operating systems or other operating systems including nonconventional operating systems. Host 20 may also be coupled to a communication link 16 that may be connected to a computer network, a telephone line, an antenna, a gateway, or any other type of communication link.

Interface 15 may be any software graphics or firmware interface such as OPENGL® or DIRECT3D® that includes procedures and functions and that may be used to control low-level operations in graphics pipeline 17. In operation, interface 15 is operable to control the processing of image data in graphics pipeline 17 in response to selected commands that are passed from an application 11 such as a programmable shader. Data is passed through some or all of the elements in graphics pipeline 17 and may then be transferred from frame buffer 70 to display 90 for viewing. For example, pixels may be written to and read from frame buffer 70 using OPENGL® function calls such as the DrawPixels and ReadPixels command, and the function CopyPixels can be used to copy a block of pixels from one region of frame buffer 70 to another.

More specifically, graphics pipeline 17 includes a vertex operations module 30 and a pixel operations module 40. Vertex operations module 30 and pixel operations module 40 are each coupled to a rasterization hardware 50. Rasterization hardware 50 is coupled to a frame buffer operations module 60, which in turn is coupled to a frame buffer 70. Frame buffer 70 may couple to pixel operations module 40. Pixel operations module 40 is also coupled to a texture memory 80, which is also coupled to rasterization hardware 50. Graphics pipeline 17 may include software, firmware, hardware, or a combination thereof. Interface 15 may be a standalone module, reside on host 20, or a combination thereof.

Because interfaces 15 such as OPENGL® are procedurally based, graphics pipeline 17 performs those low-level operations on all of the pixels passed in response to the OPENGL® procedure or function call. On the other hand, in most cases it is desirable to perform various operations on a variety of pixels to achieve the appearance the artist desires. One method for performing these various operations on a variety of pixels is to employ several passes through graphics pipeline 17 (a multi-pass scenario), each using a unique operation and/or variety of pixels.

Thus, it may be helpful to illustrate a single pass through graphics pipeline 17. Host 20 sends image data to pixel operations module 40, which may utilize a lookup table to apply a scale or bias such as a color contrast or brightness to pixels passed thereto. Host 20 also sends geometry data to vertex operations module 30. The geometry data usually includes texture coordinates or vertices (s,t,r,q) that are projected points that correspond to a location (x,y,z,w) in an image plane. The geometry data may also include normals at each of these vertices for each of the three channels (usually red, green, and blue). Vertex operations module 30 transforms image data from pixel operations module 40 into a raster coordinate system. Usually, this includes tessellation, or breaking down a continuously smooth surface into triangular surfaces. Rasterization hardware 50 usually interpolates the tessellated vertices to populate the pixels within each of these surfaces. In some applications, rasterization hardware 50 may also request a texture map from texture memory 80 which is then applied to all of the pixels in rasterization hardware 50. These pixels are then passed to frame buffer 70.

Frame buffer operations module 60 then may perform a variety of functions on the data passed from rasterization hardware 50 and then pass this data to frame buffer 70. Some of these functions include, but are not limited to, a depth test, stencil test, and blending, and are performed on all of the pixels passed to frame buffer operations module 60. A depth test typically discards portions of an image region that fail a depth comparison. For example, the depth test may be used to clip surfaces that are further from, or are obstructed by, an object that is nearer in a field of view. A stencil test may be used as an arbitrary comparison that allows selected pixels to be rejected based on the outcome of a comparison between the value in the stencil buffer and the reference value, usually an integer. Blending usually includes operations that may be performed on the pixels in the frame buffer, such as adds, subtracts, multiplies, or clears, and is typically used when assigning color values to pixels. An operation may be performed for each of the three color channels. When frame buffer 70 has performed this operation on all of the pixels, the pixels are usually sent to a display 90.

Where programmable applications 11 such as shading algorithms are used to model the appearance of objects, an artist typically describes the appearance of one or more portions of an image by selecting those pixels that should be altered. For example, a programmable shading algorithm may be used to provide various atmospheric, light, shading, surface details, textures, and/or colors. These functions may parameterize the appearance of selected objects.

These complex appearance effects typically result in different operations being performed on each resultant geometry-based vertex. One example may be a three-D lighting operation that models the diffuse reflection of colored, directional light sources from colored surfaces. Algorithms may use an illumination function that calculates the diffuse reflection of colored directional light for each vertex of a colored surface. For example, the illumination function for a single vertex is a vector dot product of the light source coordinates and the vertex normal, multiplied by the light color, the vertex material color, and the attenuation.

Application 11 may be process one or more pixel-based portions of an image for a given geometry-based vertex by passing selected portions of image data through graphics pipeline 17 multiple times with different parameters. This allows interface 15 such as OPENGL® to be used as a single-instruction, multiple-data (SIMD) computing surface by using several basic OPENGL® functions in multi-pass operations that are called by application 11. One such function may include, for example, Copy/TexImage which may define a texture array from frame buffer 70. One such application 11 that may utilize interface 15 as a SIMD computing surface is one that utilizes the RenderMan shading language. Details for translating a shading language such as RenderMan into multiple passes through a graphics pipeline 17 driven by a graphics interface 15 such as OPENGL® may be found in co-pending U.S. patent application Ser. No. 09/056,683, entitled "System and Method for High-Speed Execution of Graphics Application Programs Including Shading Language Instructions," filed Apr. 8, 1998.

Programmable shaders are typically descriptive, rather than procedural like an interface 15 such as OPENGL®. The invention contemplates the use of any descriptive programmable application 11 that uses multiple passes to alter the appearance of an image scene, or one or more objects therein, in order to obtain a final image. These applications improve the efficiency and flexibility of the artistic visualization process. For example, application 11 may be used in reflective mapping (e.g., where a surface appears shiny and reflects surrounding surfaces). Application 11 may also perform bump mapping, which typically define normal perturbations that may be added to a surface normal; shadow depth maps typically seen from a particular viewpoint, in addition to programmable shaders. These descriptive applications are desirably implementation-independent, and provide a desired result.

Each application 11 may reside on host 20 or may be one or more separate modules. Any data upon which application software may operate, including scenes and any objects therein, may be referred to as image data. This image data may originate from memory in host 20, input/output device 14, and/or in a separate storage medium (not explicitly shown). Application 11 and image data residing on host 20 are used to illustrate one aspect of the invention. Interface 15 may couple host 20 to graphics pipeline 17 in some embodiments or couple a separate application program 11 to host 20 in others.

Higher-level or abstract descriptions 13a–13n may be used as an infrastructure between interface 15 and an application 11 to provide a framework for representing the appearance of an image scene, or objects therein. Higher-level or abstract descriptions 13a–13n may reside on host 20 (for example, as a part of an application 11 or in a graphics library (not explicitly shown)), or may be one or more separate modules. Each higher-level appearance description 13a–13n may also be an application 11 such as a programmable shading algorithm, and includes a data structure to maintain and/or access data such as geometry and appearance parameters and may be any hierarchical scene description including, but not limited to, scene graphs or retained mode interfaces. These appearance parameters include a description and an appearance of objects within the described scene. In addition, higher-level appearance descriptions 13a–13n may be used as a control interface to preside over transformations such as library procedures or functions that are used to build up scene graphs. For example, higher-level appearance descriptions 13a–13n may be used to cull or manage different levels of details in a traversal, and/or to recharacterize parameters so that bandwidth, memory and/or processor resources may be minimized.

Higher-level appearance descriptions 13a–13n may be written, for example, as programmable shaders in which a higher-level appearance description may be imbedded. For example, higher-level appearance description 13a may be traversed at least one time to produce a final abstract representation or description 13b. Alternatively, a plurality of higher-level appearance descriptions 13b–13n-1 may be traversed to create a final abstract representation or description 13n. Traversing may be implemented using a variety of methods, and includes translating or mapping a higher-level appearance description into another representation. For example, the final abstract representation represents a set of multi-pass steps or operations that may be directly executed by using interface 15. As described below, the order of these steps may be optimized to expedite processing or execution time. Thus, interface 15 and/or graphics pipeline 17 may use the final abstract representation to render or draw the described scene.

Figure 2A:
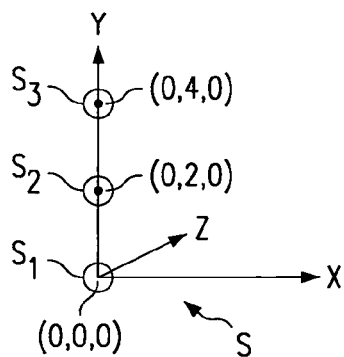
FIG. 2A graphically illustrates a scene.
Figure 2B:
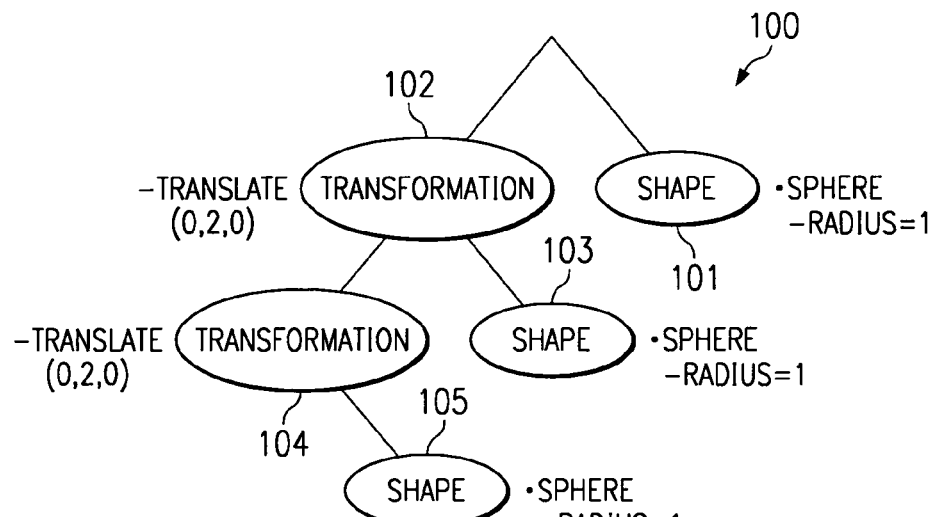
FIG. 2B graphically illustrates the relationship between the scene in FIG. 2A and one example of a higher-level appearance description.
Figure 2C:
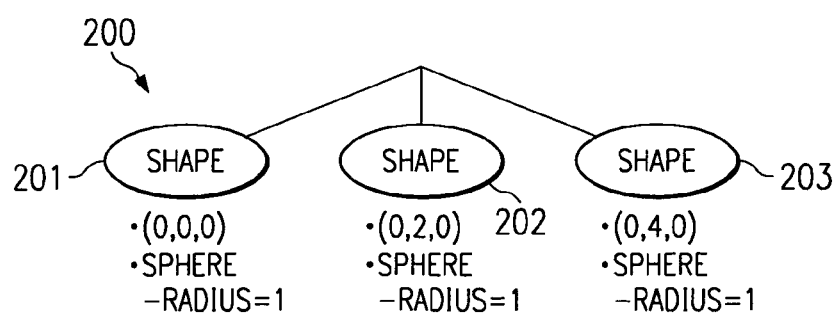
FIG. 2C graphically illustrates the relationship between the scene and one example of a higher-level appearance description.

FIGS. 2A–2C graphically illustrate the relationship between a scene and two examples of higher-level appearance descriptions. A scene S is illustrated in FIG. 2A, includes a plurality of image pixel values, and may be described by a variety of appearance descriptions. In this embodiment, scene S is a portion of image data. Within scene S, the three spheres $S_1$–$S_3$ each have a radius of 1, and are located at respective (x,y,z) coordinates (0,0,0), (0,2,0), and (0,4,0).

Referring to FIGS. 2B and 2C, scene graphs or retained mode interfaces may be used as one example of higher-level appearance descriptions for the appearance of three spheres in scene S of FIG. 2A. Scene graphs are used to illustrate several aspects of the invention. For example, scene graphs may be used by visualization applications 11 as a data structure to retain data, as well as an infrastructure to control geometry and other transformations, procedures, functions or libraries to build up the scene graph. Each scene graph typically includes an internal node, where a transformation or function may be applied to the shape, appearance and/or geometry of all of its children. Any kind of transformation or function may be applied, including simple functions such as translations, and complex functions such as blending. Each scene graph also includes at least one leaf node, which has no children. Each node typically includes some shape, form, or geometry description that may be used, such as a sphere, and an appearance, such as radius=1, and/or color=red. For example, the shape may be a sphere of radius one whose center is at (0,0,0). This sphere may be translated two units in the y direction, so that its center is at a resultant position (0,2,0). Two examples of scene graphs are discussed in conjunction with FIGS. 2B and 2C.

FIG. 2B illustrates a scene graph 100 that may be used to represent scene S. Scene graph 100 has three shape nodes and two transformation nodes. In this illustration, each shape node has an identical appearance and geometry (e.g., a sphere with radius 1). Scene graph 100 illustrates an internal node with one leaf child, shape leaf node 101, where the sphere with radius 1 is at the origin (0,0,0). Scene graph 100 may then be traversed to reach another internal node 102, a transformation node that has one leaf child, shape leaf node 103. In this illustration, transformation node 102 translates shape leaf node 103 two units in the y direction. Thus, the sphere represented by shape leaf node 103 is at a location (0,2,0). The third sphere may be obtained by traversing scene graph 100 through another internal transformation node 104 to reach its child, shape leaf node 105.

Similarly, FIG. 2C illustrates a scene graph 200 that also represents scene S. Scene graph 200 has three shape leaf nodes 201, 202, and 203. In this illustration, each of the three shape nodes in scene graph 200 has a different geometry. For example, shape node 201 is a sphere with radius 1 located at (0,0,0). On the other hand, shape nodes 202 and 203 are each spheres with radius 1 located at respective locations (0,2,0) and (0,4,0).

Scene graphs 100 and 200 may be implemented by a variety of techniques and as a variety of data structures. For example, scene graphs may be implemented in an object-oriented language, where each node may be represented as an object. In addition, each traversal may be implemented as a procedure or function. For example, in object-oriented programming, the procedure may begin at any node within a scene graph, and each object may be programmed to know how to traverse, shade, tessellate, and/or draw itself. For example, an interior node may traverse through all of its children until it is completed.

Values within scene graphs 100 and 200 may be used to manage user data and resources, such as removing or reducing data that is not visible or otherwise not required in a scene. For example, an object deep in the background of the scene may be visible in one or more perspective angles of the scene. Similarly, a level of detail traversal may be associated with a level of detail that will appear in the scene. For example, foreground objects often are illustrates with a higher level of detail than those objects in the background of a scene. Such advantages minimize or reduce unnecessary processing time and/or resources that are required to process this data, and are further discussed in conjunction with FIGS. 3A and 3B.

Similarly, values within scene graphs 100 and 200 may also be structured so that parameters may be supplied and evaluated on scene geometry for a variety of pixel-based applications, including programmable shading. These parameters may then be accessed by frame buffer 70 for multi-pass operations in graphics pipeline 17. Referring again to FIG. 2A, parameters $P_{v1}$–$P_{v4}$ define values of a selected parameter of the geometry. For example, a sphere may include parameters $P_{v1}$–$P_{v4}$ such as colors or blends thereof that vary across its surface. Any appearance-related parameters for each vertex within the geometry may be derived from parameters $P_{v1}$–$P_{v4}$.

Each scene graph may retain a list of parameters for a parametric surface. For example, traversals of scene graphs 100 and 200 may also be used to generate new scene graphs (not explicitly shown), which parameterize parameters $P_{v1}$–$P_{v4}$ for the parametric surface defined by scene S. These new scene graphs may retain the list of parameters for scene S. Any surface may be reparameterized by using a number of points that uniquely define the surface, such as three points for a sphere and four points for any other surface. For example, a parametric description for sphere of radius r=1 whose center is at (0,0,0) is given by the equation $x^2+y^2+z^2=1$. In order to provide correspondence between parameters $P_{v1}$–$P_{v4}$ to geometry, points on the sphere may be found to satisfy the geometric requirements. This provides the variation of each parameter as a function of surface coordinates, which may be drawn as a vertex color, or set of colors. For example, x may be written or reparameterized to the value x=r sin θ cos Ø; y=r sin θ sin Ø; and z=r cos θ. Reparameterization also may provide derivatives of the parameters, such as rates of change in a shader across the surface.

These parametric equations may be evaluated or tessellated by graphics pipeline 17 to approximate the surface. If the parameter is changing, as graphics pipeline 17 tessellates the surface, the reparameterization may provide the value at each vertex of the geometry for parameters $P_{v1}$–$P_{v4}$. On the other hand, if the parameter is constant, only one value need be queried. In some applications, it may be desirable to cache results in a storage medium such as texture memory 80 from tessellations performed within a first pass through graphics pipeline 17. Such a configuration may save processing time and resources. These values may be then used by an interface 15 such as OPENGL® to draw the surface.

These new scene graphs may represent a final representation from which the desired scene may be drawn, or further traversals may be performed to reach an appropriate level of detail and to generate the final representation.

FIGS. 3A–3C graphically illustrate another aspect of a higher-level appearance description. Scene graphs are used as one example of a higher-level appearance description to illustrate several aspects of the invention.

For example, FIG. 3A illustrates a scene graph 300 that includes objects A, B, C, and D. Each object may be a function, an application 11, an image scene, or object therein, and includes corresponding parameters $V_A$–$V_D$. Each of the parameters may represent geometry, texture, color, etc. Scene graph 300 also includes a plurality of appearances each associated with a level of geometry desirable for its representation in the scene. Here, an artist has designated three different levels of representation $A_1$–$A_3$ for an object A, e.g., for near, mid-range and distant perspectives, respectively. These representations may include a number of tessellated surfaces that provide sufficient detail of the appearance as desired.

To illustrate, near representation $A_1$ may be tessellated into 10,000 surfaces; mid-range representation $A_2$ may be tessellated into 1,000 surfaces; and distant representation $A_3$ may be sufficiently described with 100 tessellated surfaces. These representations may be defined by the user or artist, or automatically defined. A rendering of shading for representation $A_1$ may require, for example, 5,000 passes through graphics pipeline 17, whereas rendering for shading for representation $A_3$ may require 10 passes. Such a configuration desirably minimizes data sent to graphics pipeline 17, because only those tessellated surfaces that are necessary to achieve a desired appearance are used. Such an advantage also may reduce resources such as memory, processing, and/or bandwidth requirements.

FIG. 3B graphically illustrates at least two level of detail traversals of the higher-level appearance description in FIG. 3A. Scene graph 310 may represent a final representation from which the desired scene may be drawn, or further traversals may be performed to reach an appropriate level of detail and to generate the final representation. This traversal reduces processing time and/or resources that would otherwise be needed to process and/or clip objects not in the scene.

To illustrate, an appropriate representational level for each parameter or object A may be selected by a user request. Many methods may be used to implement such a selection process. For example, an artist may manually, or a flight simulator application may automatically, select near representation $A_1$ and traverse scene graph 300 to generate a second scene graph 310. For example, the artist may select $A_1$ to be in a foreground of a scene. On the other hand, the flight simulator may algorithmically calculate the relative position and/or size of an object as a function of movement during execution of the program.

As another illustration, the traversal may represent an algorithmic (e.g., shading) level of detail traversal. For example, an artist may desire that object A is diffuse and specular for different representations $A_1$ and $A_2$. Distances to object A within the scene may be similarly calculated as discussed above, and based on the expected level of detail desired, the scene graph may select the shading algorithm to apply to object A.

FIG. 3C graphically illustrates another traversal of the higher-level appearance description in FIG. 3A. The total number of temporary requirements for a storage medium such as texture memory 80 in graphics pipeline 17 includes an amount of space allotted for parameters $V_A$–$V_D$. Scene graph 300 may be traversed to generated scene graph 320 to manage and thus minimize these storage requirements and/or to avoid or eliminate data replication. For example, scene graph 300 may be translated into scene graph 320, a form that includes new variable name $V_{new}$. Variable $V_{new}$ may be shared between objects and/or algorithms A–D. These variable names will not collide during processing within graphics pipeline 17, because they are each typically used in a multi-pass scenario at separate times. This provides the advantage of managing resources that may be statically allocated.

To illustrate, parameters $V_A$–$V_D$ may each represent a color of corresponding object A–D. Thus for scene graph 300, object A may be processed through graphics pipeline 17 and assigned its color $V_A$=red. Similarly and at different processing times, object B may be processed through graphics pipeline 17 and assigned its color $V_B$=blue, and so on. The color may be blended with the pixels that represent each object by retrieving the associated object's parameter from texture memory 80. In contrast, scene graph 320 may be processed by using only a single variable $V_{new}$ that is reassigned for each object as it is processed through graphics pipeline 17. Scene graph 320 may represent a final representation from which the desired scene may be drawn, or further traversals may be performed to reach an appropriate level of detail and to generate the final representation.

The higher-level appearance descriptions described and discussed in conjunction with FIGS. 2A–3C may be used in any combination, for any number of traversals. For example, culling and/or level of detail traversals may be performed in conjunction with parameterization.

FIG. 4 illustrates an example of a method for representing scenes. Although steps 400–406 are illustrated as separate steps, various steps may be ordered in other logical or functional configurations, or may comprise single steps. The method may be used with any hierarchical way to describe a scene, including scene graphs or retained mode interfaces. Again, a scene graph is used to illustrate one aspect of the invention.

The method begins in step 400, where a first scene graph is created with one or more applications 11. As discussed in conjunction with FIGS. 2A–3C, the scene graph may be implemented by a variety of different methods or algorithms, and includes a description of the appearance and geometry of objects within a scene.

In step 402, a request for action is generated, either by a user such as an artist, or automatically, by an application 11 such as a flight simulator. For example, the user may requests that the scene be drawn or rendered which may be represented by a request to traverse the first scene graph. In response to the user request, at least one traversal of the scene graph is performed to create a new scene graph in step 404. In some applications, where a plurality of applications 11 are in use, the request may be to perform a traversal over all applications 11.

This traversal may facilitate defining temporary storage requirements in step 406, which may manage and thus minimize resources that may be statically allocated. For example, temporary requirements for a storage medium such as texture memory 80 may be minimized by translating a scene graph into a form that utilizes shared variables, as was discussed in conjunction with FIG. 3C. These shared variables will not collide during the rendering process, because each of these variable names is typically used in a multipass scenario at separate times.

In step 408, if no additional data management is to be performed, the new scene graph is the final scene graph, which is ready to be drawn by graphics pipeline 17. The method proceeds to step 410, where the final scene graph may be rendered in response to the user request in step 402. On the other hand, the action requested in step 402 may include a number of traversals to be performed and new scene graphs generated, in order to reach a final scene graph. Thus, the method proceeds to step 412 and then returns to step 404 to traverse the prior scene graph and to generate a new scene graph in response to the traversal.

For example, the method may determine in step 408 that surface parameterizations and/or level of detail traversals are to be performed, as discussed in conjunction with FIGS. 2C–3C. In addition, additional scene graphs to be used in multiple applications 11 may be traversed to optimize the use of variables therefor.

Thus, it is apparent that there has been provided in accordance with the present invention, a system and method for representing scenes that satisfies the advantages set forth above. For example, the present invention provides an infrastructure for managing data to control scene appearances that may minimize necessary computing time and resources. The invention allows for surface parameters to be retained and evaluated in a multi-pass scenario using a graphics system interface such as OPENGL®. While the invention has been particularly shown by the foregoing detailed description, various changes, substitutions, and alterations may be readily ascertainable by those skilled in the art and may be made herein without departing from the spirit and scope of the present invention as defined by the following claims.

What is claimed is:

1. A method for representing a scene, comprising:
   providing a higher-level appearance description of an appearance geometry in a retained-mode representation, wherein the higher-level appearance description is created using a first appearance description;
   selecting a representational level for a parameter or object in the higher-level appearance description;
   defining a temporary storage requirement for a statically-allocated memory resource; and
   traversing the retained-mode representation according to the selected representational level and the defined temporary storage requirement to provide a final representation that can be rendered by a graphics pipeline.

2. The method of claim 1, wherein the retained-mode representation is a scene graph.

3. The method of claim 1, further comprising traversing the retained-mode representation to provide another retained-mode representation and traversing the another retained-mode representation to provide the final representation of the scene.

4. The method of claim 1, further comprising drawing a scene from the final representation.

5. The method of claim 1, wherein the step of traversing includes automatically selecting appearance detail from the retained-mode representation.

6. The method of claim 1, wherein the step of traversing includes defining a parametric surface from the higher-level appearance description and retaining geometry parameters from the parametric surface.

7. The method of claim 1, wherein the step of traversing includes selecting the final representation based on at least one of the group consisting of performance characteristics of the graphics pipeline and memory characteristics of the graphics pipeline.

8. A scene representation system, comprising:
a processor;
a computer-readable medium coupled to the processor;
a statically-allocated memory resource;
a higher-level appearance description residing on the computer-readable medium, the higher-level appearance description represented by an appearance of geometry in a retained-mode representation that is traversed according to a selected representational level of a parameter or object in the higher-level appearance description and a defined temporary storage requirement for the statically-allocated memory resource to provide a final representation that can be rendered by a graphics pipeline, wherein the higher-level appearance description is created using a first appearance description; and
wherein the graphics pipeline is coupled to the computer-readable medium and operable to render the final representation.

9. The system of claim 8, wherein the retained-mode representation is a scene graph.

10. The system of claim 8, wherein the retained-mode representation is traversed to provide another retained-mode representation, the another retained-mode representation being traversed to provide the final representation of the scene.

11. The system of claim 8, wherein the higher-level appearance description is one of the group consisting of a programmable shading algorithm, a bump map, and a reflective map.

12. The system of claim 8, wherein the retained-mode representation is traversed by including automatic selection of appearance detail from the retained mode representation.

13. The system of claim 8, wherein the higher-level appearance description is operable to select geometry parameters to a level of detail that minimizes at least a portion of total hardware resource consumption.

14. The system of claim 8, further comprising a graphics system interface coupled to the processor and to the graphics pipeline, the graphics system interface operable to control the graphics pipeline and to perform at least a subset of the functions of those performed by the graphics system interface sold under the trademark OPENGL®, wherein the OPENGL® graphics system interface is a graphics system interface capable of cooperating with graphics pipeline.

15. An infrastructure for representing a scene, comprising:
a computer-readable medium;
a statically-allocated memory resource; and
software resident on the computer-readable medium and operable to generate a higher-level appearance description of an appearance of geometry in a retained-mode representation, to select a representational level of a parameter or object in the higher-level appearance description, to define a temporary storage requirement for the statically-allocated memory resource and to traverse the retained-mode representation according to the selected representational level and the defined temporary storage requirement to provide a final representation that can be rendered by a graphics pipeline, wherein the higher-level appearance description is created using a first appearance description.

16. The infrastructure of claim 15, wherein the higher-level appearance description is operable to select geometry parameters to a level of detail that minimizes at least a portion of total hardware resource consumption.

17. The infrastructure of claim 15, wherein the higher-level appearance description is operable to select geometry parameters to a level of detail that minimizes at least a portion of total hardware resource consumption.

18. The infrastructure of claim 15, wherein the higher-level appearance description is one of the group consisting of a programmable shading algorithm, a bump map, and a reflective map.

19. The infrastructure of claim 15, wherein the retained-mode representation is a scene graph.

20. The infrastructure of claim 15, wherein the software is further operable to traverse the retained-mode representation by including automatically selecting appearance detail from the retained-mode representation.

* * * * *